(12) United States Patent
Ye et al.

(10) Patent No.: US 11,762,056 B2
(45) Date of Patent: Sep. 19, 2023

(54) METHOD AND APPARATUS FOR DETERMINING LOCATION OF AN OBJECT

(71) Applicant: Red Point Positioning Corporation, Boston, MA (US)

(72) Inventors: ZhenZhen Ye, Westford, MA (US); Chunjie Duan, Boston, MA (US); Georgiy Pekhteryev, Boston, MA (US)

(73) Assignee: Red Point Positioning Corporation, Boston, MA (US)

( * ) Notice: Subject to any disclaimer, the term of this patent is extended or adjusted under 35 U.S.C. 154(b) by 275 days.

(21) Appl. No.: 16/961,515

(22) PCT Filed: Jan. 11, 2019

(86) PCT No.: PCT/US2019/013352
§ 371 (c)(1),
(2) Date: Jul. 10, 2020

(87) PCT Pub. No.: WO2019/140302
PCT Pub. Date: Jul. 18, 2019

(65) Prior Publication Data
US 2020/0382902 A1    Dec. 3, 2020

Related U.S. Application Data

(60) Provisional application No. 62/616,802, filed on Jan. 12, 2018.

(51) Int. Cl.
*G01S 5/10*         (2006.01)
*G01S 11/08*        (2006.01)
(Continued)

(52) U.S. Cl.
CPC .............. *G01S 5/14* (2013.01); *G01S 5/0027* (2013.01); *G01S 5/0036* (2013.01); *G01S 5/021* (2013.01);
(Continued)

(58) Field of Classification Search
CPC .......... H04W 4/023; G01S 11/08; G01S 5/10
See application file for complete search history.

(56) References Cited

U.S. PATENT DOCUMENTS 7,239,277 B2 *   7/2007  Fullerton ............... G01S 5/0289
                                                 342/465
7,629,925 B2 *  12/2009  Sugiimoto ............. G01S 19/44
                                                 342/357.23
(Continued)

OTHER PUBLICATIONS

International Preliminary Report on Patentability for PCT/US2019/013352 dated Jul. 23, 2020, 10 pgs.
(Continued)

*Primary Examiner* — Muthuswamy G Manoharan
(74) *Attorney, Agent, or Firm* — GUNTIN & GUST, PLC; Robert Gingher

(57) ABSTRACT

Systems and methods for locating a position of a target object (110, 210, 410) are provided. The target object can be equipped with a plurality of spatially distributed antennas (220a, 220b, 420a, 420b), and can be located within a network of a plurality of anchors (105, 305, 505) at fixed locations. A plurality of anchor pairs (105a, 105b, 305a, 305b, 505a, 505b) can be assigned. Each anchor pair can include at least two anchors. The anchor pairs can transmit and receive range request, REQ, and range response, RSP, packets (1210,1215,1220). The REQ and RSP packets can be received by the antennas on the target object (1225,1230). Distance differences between the target object to the first anchor and from the target object to the second anchor of each anchor pair can be estimated (1235), based on times at which the REQ packet and the RSP packet are received at the target object. The position of the target object can be estimated based on the distance differences (1240).

20 Claims, 13 Drawing Sheets

(51) Int. Cl.
  *H04W 64/00* (2009.01)
  *H04W 4/02* (2018.01)
  *G01S 5/00* (2006.01)
  *G01S 5/14* (2006.01)
  *G01S 5/02* (2010.01)

(52) U.S. Cl.
  CPC ............ *G01S 5/02213* (2020.05); *G01S 5/10* (2013.01); *G01S 11/08* (2013.01); *H04W 4/023* (2013.01); *H04W 64/003* (2013.01); *G01S 5/0247* (2013.01)

(56) References Cited

U.S. PATENT DOCUMENTS

| | | | |
|---|---|---|---|
| 9,766,322 B2 * | 9/2017 | Taylor, Jr. | G01S 11/02 |
| 2003/0174086 A1 | 9/2003 | Hirt | |
| 2010/0033339 A1 * | 2/2010 | Gurley | G01S 11/02 340/686.1 |
| 2014/0016485 A1 | 1/2014 | Curticapean | |
| 2015/0156746 A1 | 6/2015 | Horne et al. | |
| 2017/0078897 A1 | 3/2017 | Duan et al. | |
| 2019/0223140 A1 * | 7/2019 | Grossmann | H04W 48/10 |

OTHER PUBLICATIONS

International Search Report & Written Opinion for PCT/2019/013352 dated Jul. 18, 2019, 13 pgs.

* cited by examiner

METHOD AND APPARATUS FOR DETERMINING LOCATION OF AN OBJECT

CROSS-REFERENCE TO RELATED APPLICATIONS

The present application is a U.S. National Stage of International Application No. PCT/US2019/013352, having an International Filing Date of Jan. 11, 2019, which claims priority to U.S. Provisional Patent Application No. 62/616,802, filed on Jan. 12, 2018 and entitled "METHOD AND APPARATUS FOR DETERMINING LOCATION OF AN OBJECT," which are incorporated herein by reference in their entirety.

FIELD OF THE DISCLOSURE

This disclosure relates generally to wireless locationing systems, and more particularly to methods and systems for determining the location of an object equipped with more than one spatially distributed antennas.

BACKGROUND OF THE DISCLOSURE

In many applications, it may be desirable to estimate a location of a target object. In some implementations, a system may be designed to allow a target to carry out location estimation using radio frequency (RF) signals, e.g., a wireless device may estimate its location using signal strength of RF signals received from anchors in fixed locations. Other objects may obstruct the path between the target and the anchors, thereby interfering with the RF signals.

SUMMARY OF THE DISCLOSURE

At least one aspect of this disclosure is directed to a method for locating a position of a target object equipped with a plurality of spatially distributed antennas in a network of a plurality of anchors at fixed locations. The method can include assigning a plurality of anchor pairs. Each anchor pair of the plurality of anchor pairs can include at least two anchors of a plurality of anchors. Each anchor pair can be configured to transmit ranging packets according to a transmission schedule by transmitting, by a first anchor of the anchor pair, a range request (REQ) packet. A second anchor of the anchor pair can receive the REQ packet. The second anchor can transmit a range response (RSP) packet in response to the REQ packet. The method can include receiving, by at least one of the plurality of antennas on the target object, the REQ packet. The method can include receiving, by at least one of the plurality of antennas on the target object, the RSP packet. In some implementations, the method can include estimating, for each anchor pair, a distance difference between a first distance from the target object to the first anchor and a second distance from the target object to the second anchor, based on times at which the REQ packet and the RSP packet are received at the target object. In some implementations, the method can include estimating, for each anchor pair, distance differences from the target object to the first anchor and the second anchor, based on times at which the REQ packet and the RSP packet are received by at least two of the plurality of antennas of the target object. The method can include estimating the position of the target object based on the estimated distance differences for each anchor pair.

In some implementations, each of the plurality of antennas on the target can include a respective internal clock. In some implementations, the internal clocks of the plurality of antennas can be synchronized. In some implementations, the internal clocks of the plurality of antennas may not be synchronized.

In some implementations, a turnaround time can be embedded in the RSP packet. In some implementations, a turnaround time can be predetermined and may not transmitted as part of the RSP packet.

In some implementations, the method can include transmitting the distance differences for each anchor pair from the target object to an external position estimator remote from the target object. In some implementations, the external position estimator can estimate the position of the target object based on the estimated distance differences for each anchor pair.

In some implementations, the target object can include a local position estimator configured to estimate the position of the target object based on the estimated distance differences for each anchor pair. In some implementations, the method can include transmitting the estimated position of the target object to at least one of the plurality of anchors in the network.

At least another aspect of this disclosure is directed to a system for locating a position of a target object. The system can include a target object equipped with a plurality of spatially distributed antennas and one or more processors. The system can include a position estimator. The system can include a plurality of anchors at fixed locations forming an anchor network. Each anchor of the plurality of anchors can have a transceiver. The anchors can be grouped into respective anchor pairs configured to transmit ranging packets according to a transmission schedule. A first anchor of an anchor pair can transmit a range request (REQ) packet. A second anchor of the anchor pair can receive the REQ packet. The second anchor can transmit a range response (RSP) packet in response to the REQ packet. Each of the plurality of antennas on the target object can be configured to receive the REQ packet and the RSP packet. In some implementations, the at least one processor can be configured to estimate, for each anchor pair, a distance difference between a first distance from the target object to the first anchor and a second distance from the target object to the second anchor, based on times at which the REQ packet and the RSP packet are received at the target object. In some implementations, the at least one processor can be configured to estimate, for each anchor pair, distance differences from the target object to the first anchor and the second anchor, based on times at which the REQ packet and the RSP packet are received by at least two of the plurality of antennas of the target object. The position estimator can be configured to estimate the position of the target object based on the estimated distance differences for each anchor pair.

In some implementations, each of the plurality of antennas can be coupled with a respective RF front-end (RFFE) processing unit. The one or more processors can include a central processing unit coupled with all of the RFFE processing units.

In some other implementations, each of the plurality of antennas can be coupled with a respective RF front-end (RFFE) processing unit and the one or more processors can include a respective processing unit coupled with a respective one of the RFFE processing units. In some implementations, the processing units may not be synchronized.

In some implementations, a turnaround time can be embedded in the RSP packets. In some implementations, a turnaround time can be predetermined and may not be transmitted as part of the RSP packet.

In some implementations, the position estimator can be local to the target object. In some other implementations, the position estimator can be remote from to the target object. In some implementations, the one or more processors can be further configured to transmit the distance differences for each anchor pair from the target object to the external position estimator. In some implementations, the one or more processors can be further configured to transmit the estimated position of the target object to at least one of the plurality of anchors in the network.

In some implementations, this disclosure provides systems to reduce the loss of ranging signal due to obstacle blockage in time difference of arrival (TDOA) based on location estimation and methods to carry out TDOA location estimation when there is some ranging signal loss due to blockage.

In some implementations, the target object is equipped with two or more antennas which are separated spatially. The antennas share the same processing unit to process signal received from all antennas. This creates two or more line-of-sight (LOS) signal paths from an anchor to the target object as each antenna can independently receive/transmit ranging signal from/to the anchor. Since there are multiple spatially separated LOS signal paths between the target object and an anchor, the possibility that all LOS signal paths are blocked by obstacles is reduced.

In some implementations, the target object is equipped with two or more wireless transceivers which are separated spatially. Each wireless transceiver is equipped with an antenna and its own processing unit to process signal received from its antenna. The wireless transceivers have synchronized clocks. Similarly, this also creates two or more LOS signal paths from an anchor to the target object as each wireless transceiver can independently receive/transmit ranging signal from/to the anchor.

In some implementations, the target object is equipped with two or more wireless transceivers which are separated spatially. Each wireless transceiver is equipped with an antenna and its own processing unit to process signal received from its antenna. The internal clocks of the wireless transceivers are not synchronized. Similarly, this also creates two or more LOS signal paths from an anchor to the target object as each wireless transceiver can independently receive/transmit ranging signal from/to the anchor.

The TDOA ranging signal transmissions are scheduled in a fashion that the anchors transmit sequentially and the time difference of ranging signals from two different anchors can be calculated. When ranging signals are received by the target object, it combines the receiving time information from multiple signals (from multiple antennas or transceivers) to estimate its location.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1:
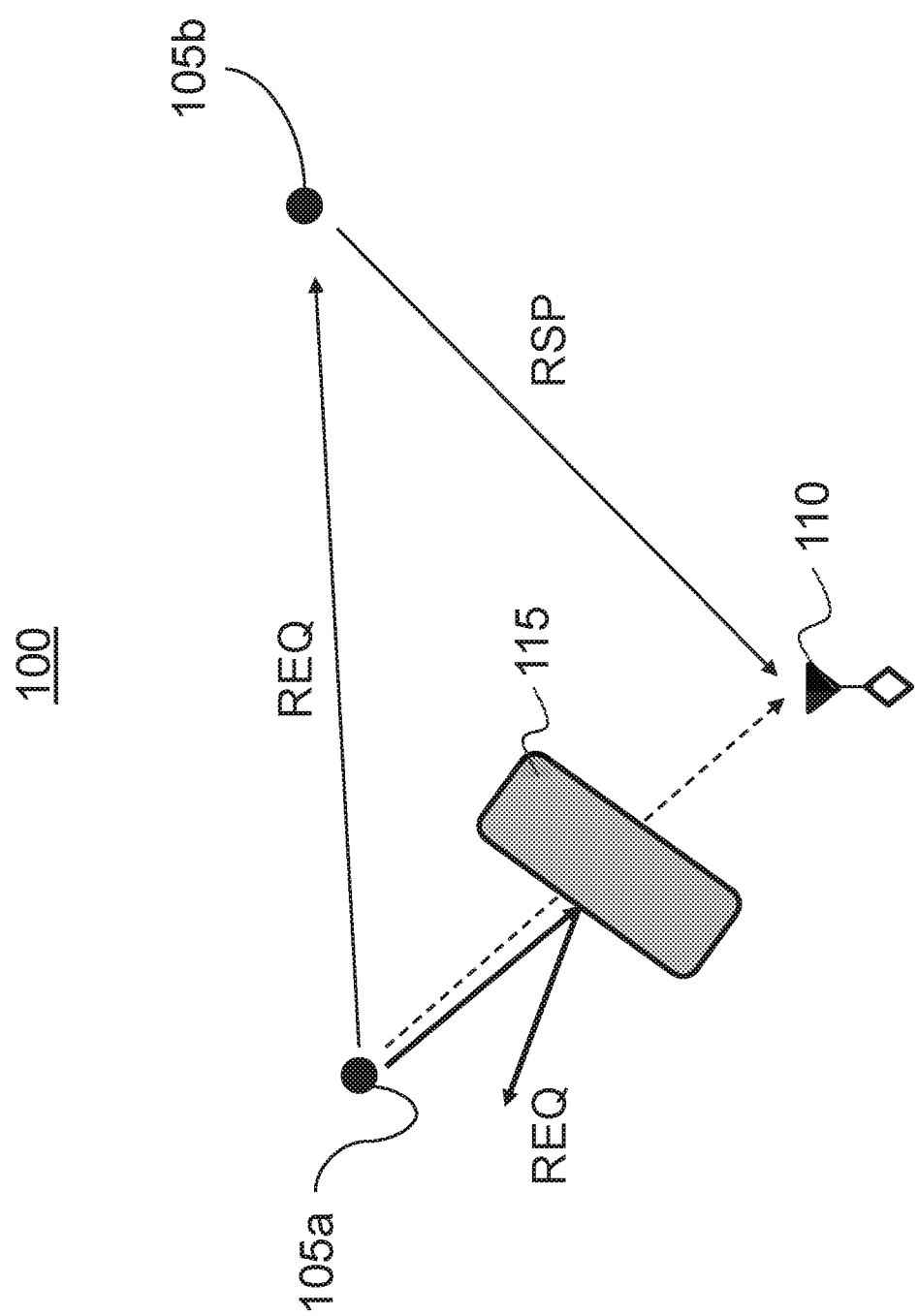
FIG. 1 illustrates an environment for locating a position of a target object in which a signal transmission is blocked by an obstacle, according to an illustrative implementation.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Time of flight of an a signal such as a radio frequency (RF) signal, also known as time of arrival (TOA), may be used for location estimation. The TOA based location estimation is typically carried out using trilateration, i.e., the location of an object is estimated based on the distances between the object to be estimated and some other objects whose positions are known. The other objects at known positions can be referred to as "anchors" in the following description. In some implementations, because the target object may not be synchronized with the anchors, the distance between the target object and an anchor can be estimated using a round-trip flight time. For example, a first device (e.g., the target object or an anchor) transmits a first ranging signal. After receiving the first ranging signal, the second device transmits a second ranging signal back to the first device. The round-trip time is defined as the time elapsed between the reception of the second ranging signal and the transmission of the first ranging signal, which can be estimated by the first device. Such a technique may be referred to as Two-Way TOA (TW-TOA).

In some other implementations, location estimate can be performed using time difference of flight, also known as time difference of arrival (TDOA). In some TDOA techniques based on location estimations, the distance difference from the target object to two anchors can be estimated at the target object by measuring the time difference of two received ranging signals from each of the pair of anchors. This distance difference can be used in the location estimation of the target object. This TDOA based location estimation technique can have technical benefits as compared with the TW-TOA approach described above. For example, this approach may use fewer transmissions in the network when there are many objects to be located and it may not require the target object to transmit as well.

TOA and TDOA based location estimation methods may assume that the ranging signal paths from the target object to the anchors are line-of-sight (LOS) paths. When a signal path is LOS, the time calculated in TOA or TDOA can be used to estimate the distance (e.g., in TOA) or distance difference (e.g., in TDOA) between the target object and the anchors. However, in many indoor environments as well as outdoor environments, obstacles (e.g., shelves, furniture, frames, poles, people, etc.) can block LOS signal paths. Thus there may be no LOS path between the target object and some of the anchors. The obstacles may cause some ranging signal loss or may create no-line-of-sight (NLOS) signal paths. The ranging signal losses can cause incomplete ranging processes, and as a result TOA or TDOA techniques may be unable to accurately estimate the location of the target object. In some implementations, the NLOS paths between the target object and the anchors can degrade the location estimation accuracy significantly. Referring briefly to FIG. 1, depicted is an environment for locating a position of a target object 110 in which a signal transmission is blocked by an obstacle 115. The environment 100 can be used, for example, to determine a location of the target object 110 via a TDOA based location estimation. In the environment 100 the nodes 105a and 105b are anchors (generally referred to as anchors 105). The LOS signal path between the anchor 105a and the target object 110 is blocked by the obstacle 115, and the target object 110 therefore may not be able to receive a ranging request packet (REQ) from the node 105a. Because there is no ranging signal heard from the anchor 105a, the target object 110 may not be able to complete a time difference calculation used in TDOA.

In a wireless network comprises of multiple anchor nodes and one or more target objects, TDOA based on location estimation can be done in a variety of different ways. In one TDOA scheme, a target object can initiate the ranging process by sending a request packet (referred to as a REQ packet) to anchors, and the anchors which have received the REQ packet may respond with a response packet (referred to as a RSP packet). Then, the anchors which have received both REQ and RSP packets can calculate the time difference needed to perform a location estimation. In another TDOA scheme, a first one of the anchors can initiate the ranging process by transmitting a REQ packet. The REQ packet can be received by a number of neighboring anchors, as well as the target object, within the first anchor's transmission range. Some or all of the anchors that receive the REQ packet can then transmit a RSP packet in response to the reception of the REQ packet, and the target object can receive both REQ and RSP packets. The target object can then calculate the time differences needed to perform location estimation.

For illustrative purposes, this disclosure primarily discusses the latter TDOA scheme. However, it should be noted that the concepts presented in this disclosure can be used with other TDOA schemes without departing from the scope of this disclosure. In addition, while this disclosure is primarily directed to determining or estimating a location of a target object in two-dimensional (2D) space, (e.g., an x-y plane), the concepts presented in this disclosure can be used to determine or estimate a location of a target object in higher spatial dimensions (e.g., three-dimensional space, sometimes referred to herein as 3D space) without departing from the scope of this disclosure.

As described above, FIG. 1 illustrates an exemplary case in which some ranging signals used for TDOA may be blocked by the obstacle 115 between the anchor 105a and the target object 110. The anchor 105a can initiate the TDOA ranging process by sending out a REQ packet. The REQ packet can be received by the anchor 105b, which can respond with a RSP packet. Without the obstacle 115, the target object 110 within the transmission ranges of both the anchor 105a and the anchor 105b could receive both REQ and RSP packets. However, the obstacle 115 blocks the LOS signal path between the anchor 105a and target object 110. Thus, the target object 110 may not be able to receive the REQ packet from the anchor 105a. As a result, the target object 110 may not be able to complete the calculation of time difference of arrival between the RSP packet and the REQ packet to be used for estimation of the location of the target object 110 based on TDOA.

Figure 2:
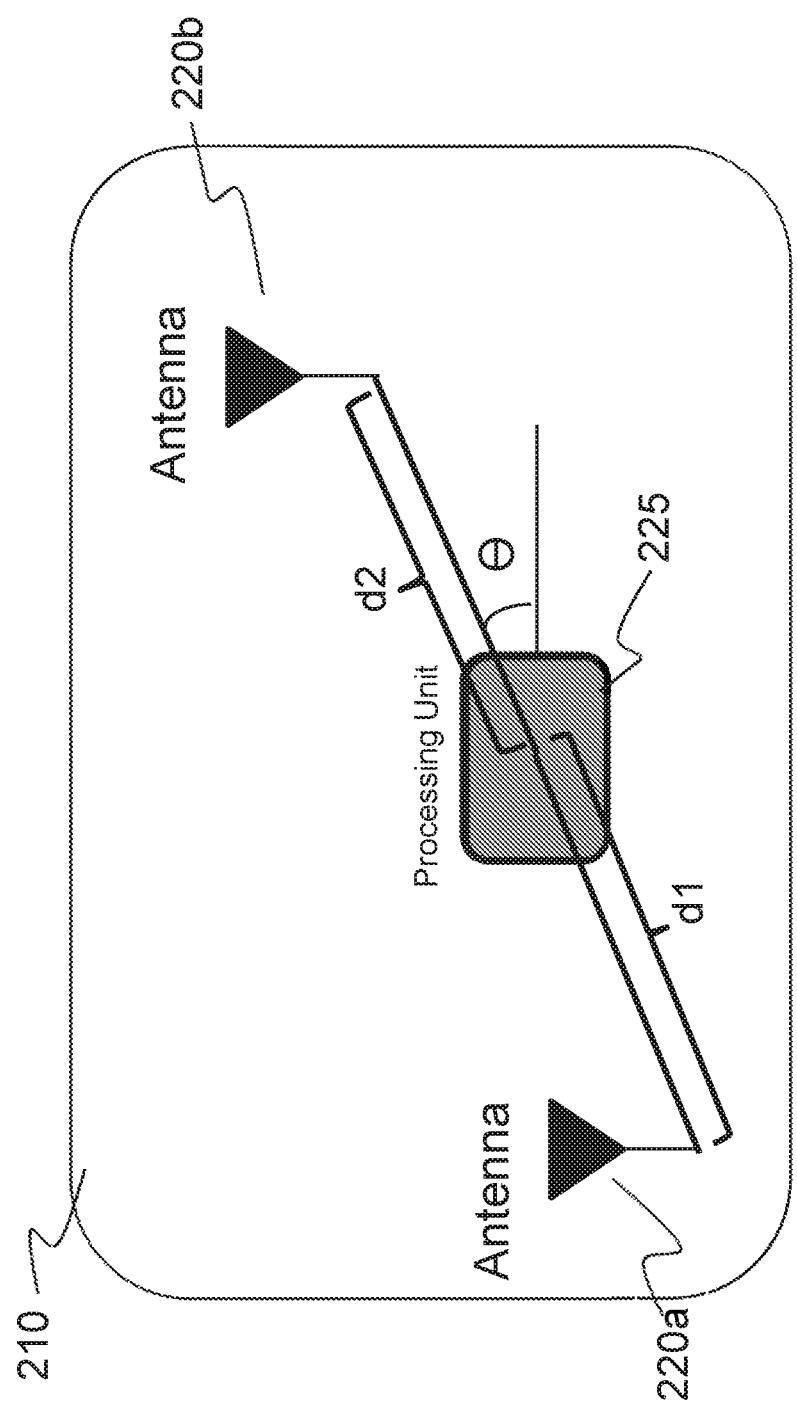
FIG. 2 illustrates a target object equipped with two antennas which are separated spatially from one another, according to an illustrative implementation.
Figure 3:
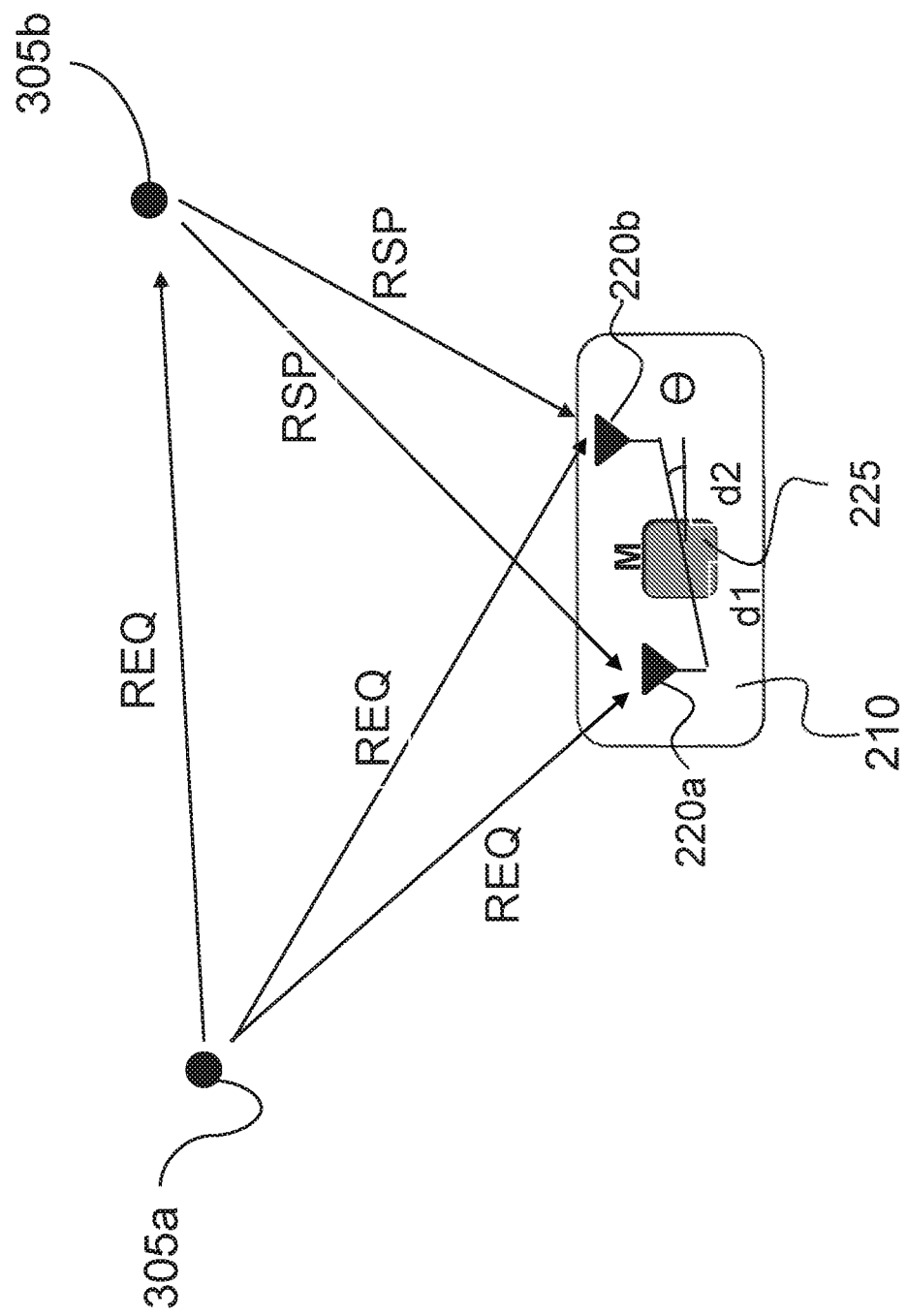
FIG. 3 illustrates an example TDOA ranging process that can be performed using the target object of FIG. 2, according to an illustrative implementation.

FIG. 2 illustrates a target object 210 equipped with two antennas 220a and 220b (generally referred to as antennas 220) which are separated spatially from one another. It should be noted that, although FIG. 2 illustrates only two antennas 220 for illustrative purposes, in some implementations, the target object 210 can be equipped with more than two antennas 220, and all of the antennas 220 can be spatially separated from one another. The antennas 220 can be coupled with a processing unit 225 on the target object 210 and the signal received by antennas 220 can be processed in the processing unit 225 for a time difference calculation, as described above. The distances from the antennas 220 to the center of the target object 210 are denoted as $d_1$ and $d_2$, respectively. Referring now to FIG. 3, depicted is an example TDOA ranging process that can be performed using the target object 210 of FIG. 2, according to an illustrative implementation. In FIG. 3, the TDOA ranging process can take place between a pair of anchors 305a and 305b (generally referred to as anchors 305) and the target object 210, which is equipped with two antennas 220a and 220b. Since the antennas 220 are spatially separated on the target object 210, the REQ packet from the anchor 305a is received at different times by each of the antennas 220. Similarly, the RSP packet from anchor 305b also is received by both antennas 220 at different times, if there is no signal path blocked by obstacle(s). The following notations are used in this disclosure:

The time that the REQ packet is received by antenna 220a as $t_{A1}$;
The time that the REQ packet is received by antenna 220b as $t_{A2}$;
The time that the RSP packet is received by antenna 220a as $t_{B1}$;
The time that the RSP packet is received by antenna 220b as $t_{B2}$.

As these time instances are recorded at the same processing unit, the target object 210 (e.g., using the processing unit 225) can calculate four values of time difference, i.e., $t_{B1}-t_{A1}$, $t_{B2}-t_{A2}$, $t_{B1}-t_{A2}$, $t_{B2}-t_{A1}$. The first two values of time difference are from the signal received by the same antenna 220, and the last two values of time difference are from the signal received by different antennas 220. These time difference values can be used to estimate the location of the center of the target object 210 in space (e.g., in an xy plane), as well as to estimate an angle θ of the line between antennas 220 (e.g., with respect to the x-axis). For example, the location of anchor 305a can be represented as ($x_A$, $y_A$), the location of anchor 305b can be represented as ($x_B$, $y_B$), the distance between anchors 305a and 305b can be represented as $d_{AB}$ and the turn-around time between transmitting the RSP packet and receiving the REQ packet at the anchor 305b can be represented as $T_t$. The following equations for time difference values can be used in calculating the location of the center of the target object 210 (x, y) and the angle θ:

$$c(t_{B1}-t_{A1}-T_t) = \sqrt{(x-d_1\cos(\theta)-x_B)^2+(y-d_1\sin(\theta)-y_B)^2} - \sqrt{(x-d_1\cos(\theta)-x_A)^2+(y-d_1\sin(\theta)-y_A)^2} + d_{AB} \quad (1)$$

$$c(t_{B2}-t_{A2}-T_t) = \sqrt{(X+d_2\cos(\theta)-x_B)^2+(y+d_2\sin(\theta)-y_B)^2} - \sqrt{(x+d_2\cos(\theta)-x_A)^2+(y+d_2\sin(\theta)-y_A)^2} + d_{AB} \quad (2)$$

$$c(t_{B1}-t_{A2}-T_t) = \sqrt{(x-d_1\cos(\theta)-x_B)^2+(y-d_1\sin(\theta)-y_B)^2} - \sqrt{(x+d_2\cos(\theta)-x_A)^2+(y+d_2\sin(\theta)-y_A)^2} + d_{AB} \quad (3)$$

$$c(t_{B2}-t_{A1}-T_t) = \sqrt{(x+d_2\cos(\theta)-x_B)^2+(y+d_2\sin(\theta)-y_B)^2} - \sqrt{(x-d_1\cos(\theta)-x_A)^2+(y-d_1\sin(\theta)-y_A)^2} + d_{AB} \quad (4)$$

When a sufficient number of time difference values from different anchor pairs similar to the anchor pair 305a and 305b are collected by the target object 210, the location (x, y) and angle θ can be estimated via techniques such as nonlinear least-squares (NLS).

Figure 4:
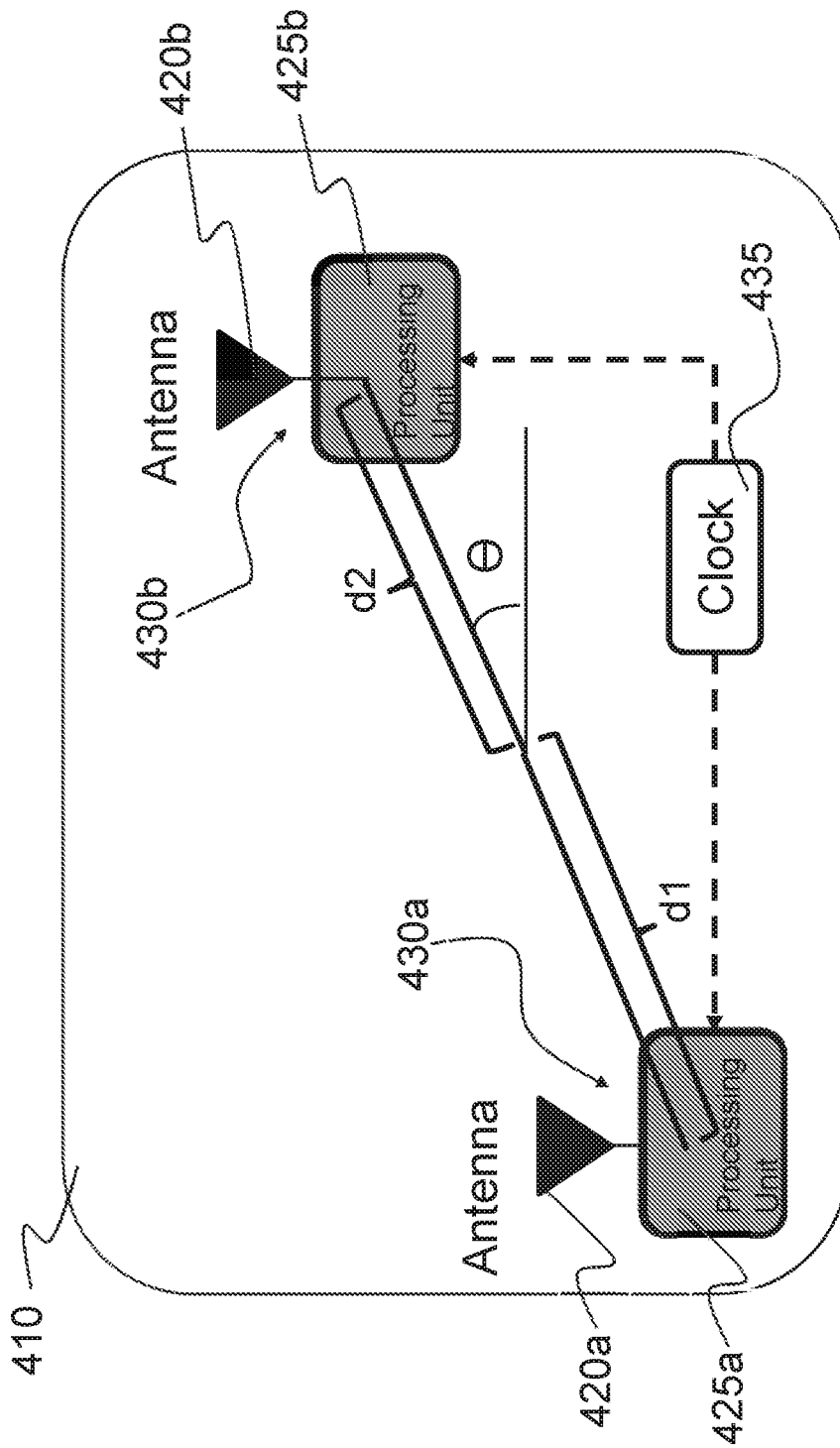
FIG. 4 illustrates a target object equipped with two wireless transceivers which are spatially separated from one another, according to an illustrative implementation.
Figure 5:
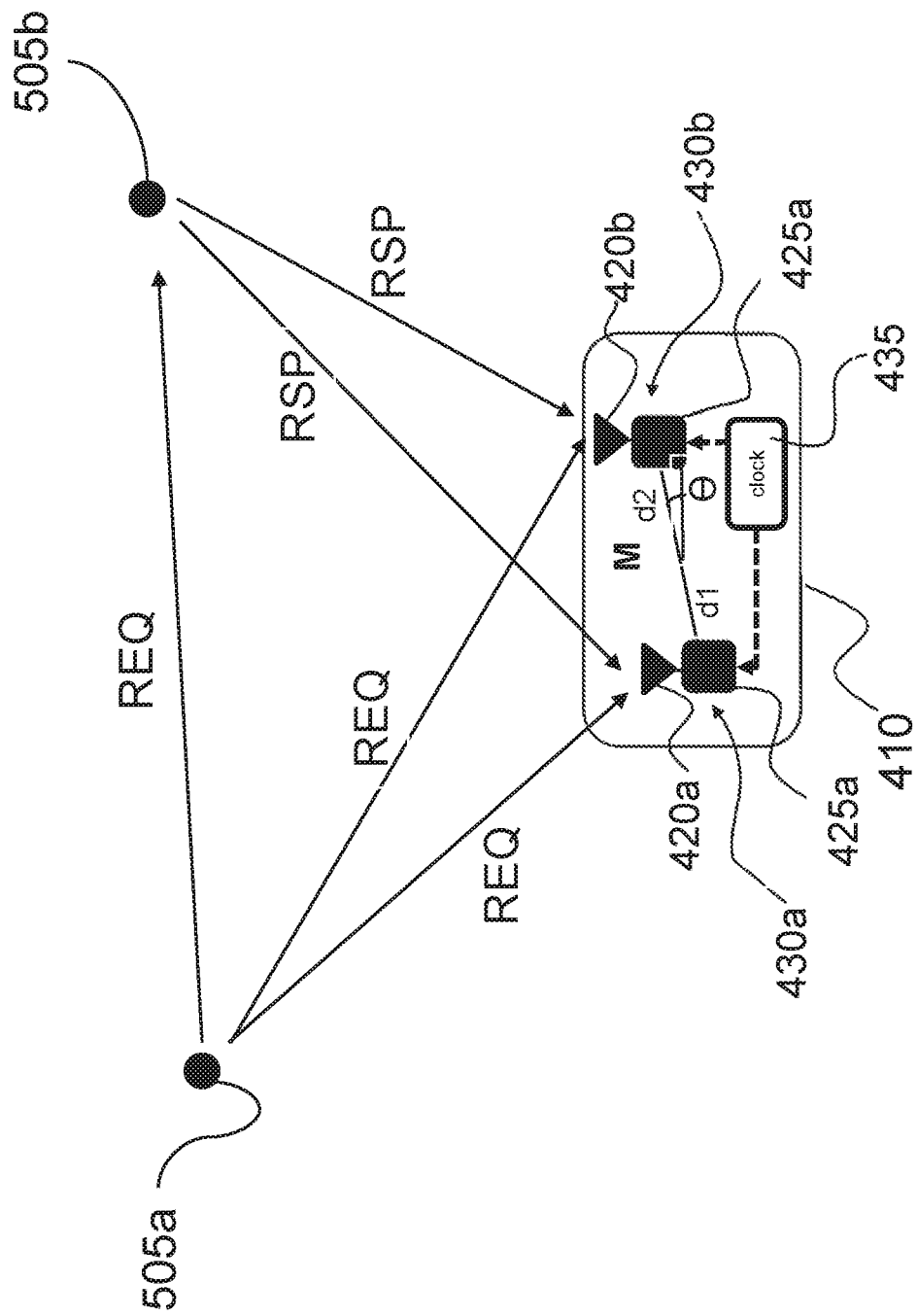
FIG. 5 illustrates an example TDOA ranging process that can be performed using the target object of FIG. 4, according to an illustrative implementation.

FIG. 4 illustrates a target object 410 equipped with two wireless transceivers 430a and 430b (generally referred to as transceivers 430) which are spatially separated from one another, according to an illustrative implementation. Each of the transceivers 430 includes a respective one of the antennas 420a and 420b (generally referred to as antennas 420) and a respective one of the processing units 425a and 425b (generally referred to as processing units 425). The wireless transceivers 430 are coupled with a synchronized clock 435 for recording time. It should be understood that the target object 410 in this implementation can be equipped with more than two wireless transceivers 430 all of which may be spatially separated from one another and coupled with the clock 435. The processing unit 425 of a wireless transceiver 430 can be configured to process signals received by its antenna 420, and can also be configured to communicate with the processing units 425 of other wireless transceivers 430. The distances from the wireless transceivers 430 to the center of the target object 410 are shown as $d_1$ and $d_2$, respectively. Referring now to FIG. 5, depicted is an example TDOA ranging process that can be performed using the target object 410 of FIG. 4, according to an illustrative implementation. In FIG. 5, the TDOA ranging process can take place between a pair of anchors 505a and 505b (generally referred to as anchors 505) and the target object 410. Because the wireless transceivers 430 are spatially separated, the REQ packet from the anchor 505a can be received by both transceivers 430 at different times. Similarly, the RSP packet from the anchor 505b can also be received by both transceivers 430 at different times, assuming there is no signal path blocked by obstacle(s). The following notations are used in this disclosure:

The time that the REQ packet is received by wireless transceiver 430a as $t_{A1}$;

The time that the REQ packet is received by wireless transceiver 430b as $t_{A2}$;
The time that the RSP packet is received by wireless transceiver 430a as $t_{B1}$;
The time that the RSP packet is received by wireless transceiver 430b as $t_{B2}$.

As these time instances are recorded by according to the synchronized clock 435, the target object 410 can calculate four values of time difference, i.e., $t_{B1}-t_{A1}$, $t_{B2}-t_{A2}$, $t_{B1}-t_{A2}$, $t_{B2}-t_{A1}$. In some implementations, these calculations can be performed, for example, by the processing units 425. The first two values of time difference are from the signal received by the same transceiver 430, and the last two values of time difference are from the signal received by different transceivers 430. These time difference values can be used to estimate a location of the center of the target object 410 (x, y) as well as an angle θ of the line between the transceivers 430. The location of anchor 505a can be represented as ($x_A$, $y_A$), the location of anchor 505b can be represented as ($x_B$, $y_B$), the distance between the anchors 505a and 505b can be represented as $d_{AB}$ and the turn-around time between transmitting the RSP packet and receiving the REQ packet at the anchor 505b can be represented as $T_t$. The equations (1)-(4) above for time difference values can be used in calculating the location of the center of the target object 410 (x, y) and the angle θ. When a sufficient number of time difference values from different anchor pairs similar to the anchor pair 505a and 505b are collected by the target object 410, the location (x, y) and angle θ can be estimated via techniques such as NLS.

Figure 6:
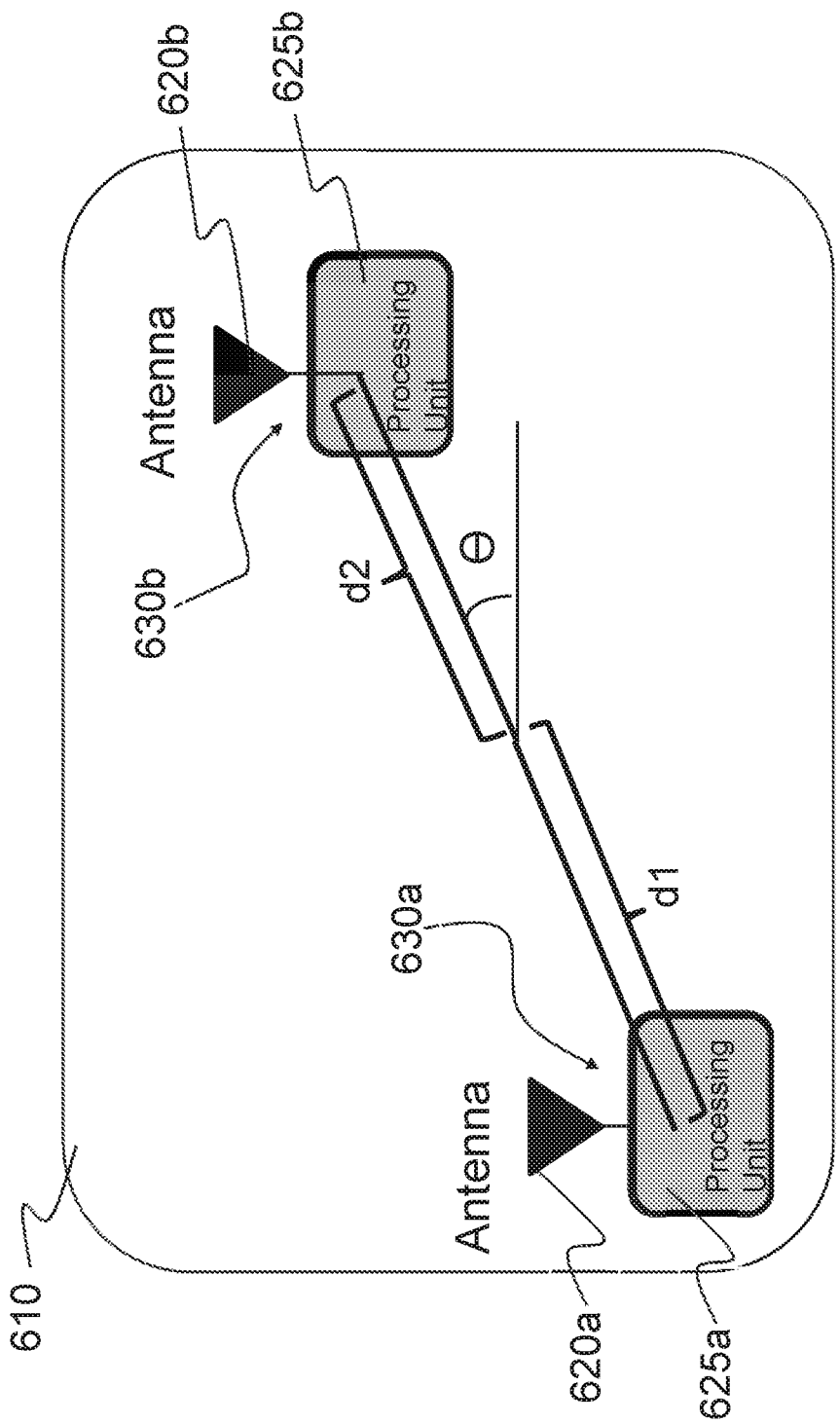
FIG. 6 illustrates a target object equipped with two wireless transceivers which are spatially separated from one another, according to an illustrative implementation.
Figure 7:
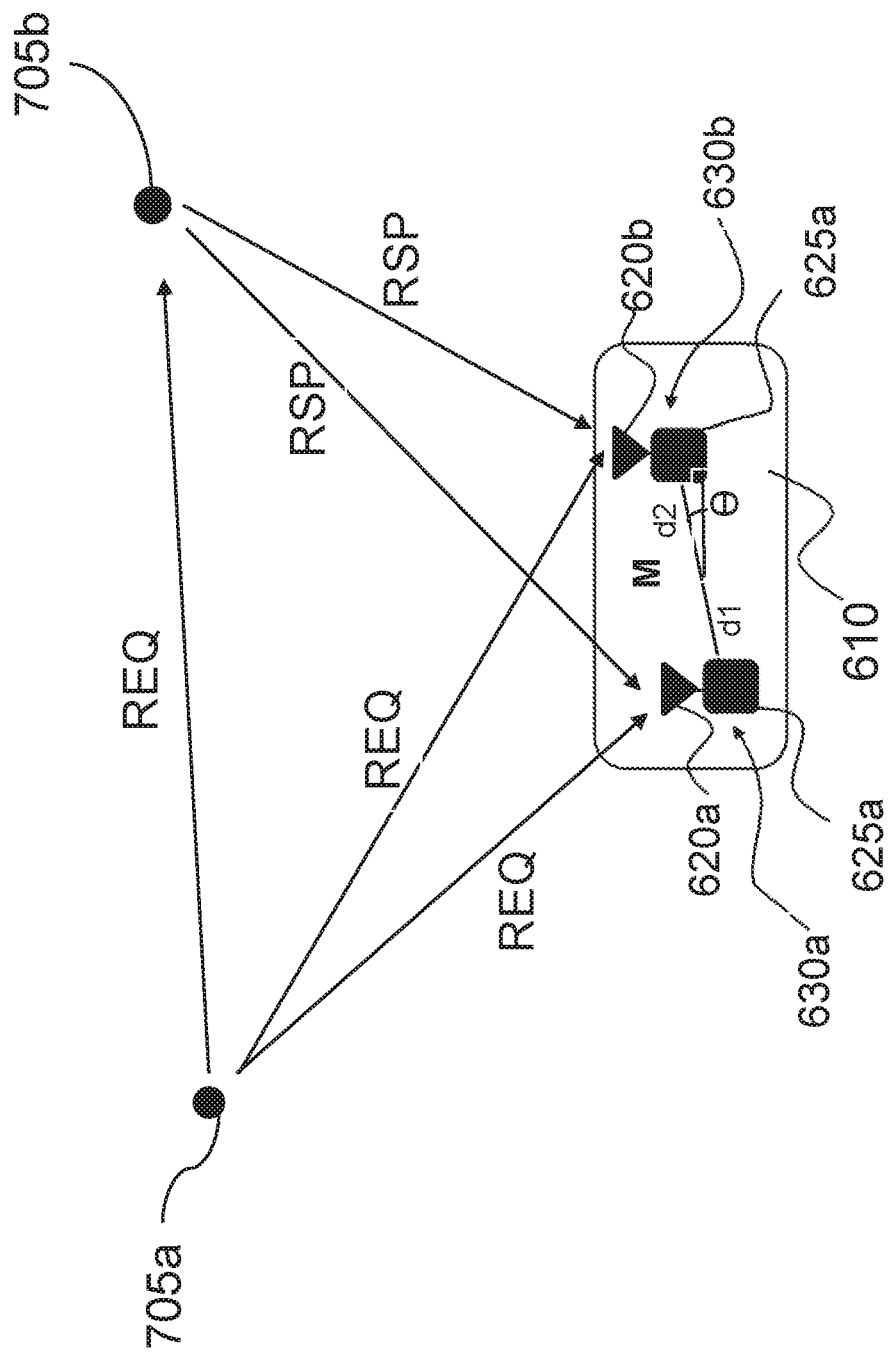
FIG. 7 illustrates an example TDOA ranging process that can be performed using the target object of FIG. 6, according to an illustrative implementation.

FIG. 6 illustrates a target object 610 equipped with two wireless transceivers 630a and 630b (generally referred to as wireless transceivers 630) which are spatially separated from one another, according to an illustrative implementation. Each of the transceivers 630 includes a respective one of the antennas 620a and 620b (generally referred to as antennas 620) and a respective one of the processing units 625a and 625b (generally referred to as processing units 625). The wireless transceivers 630 are not coupled with any synchronized clock source. Instead, each transceiver 630 can operate using its own clock signal, such that the transceivers 630a and 630b are not synchronized. It should be understood that the target object 610 in this implementation can be equipped with more than two wireless transceivers 630 all of which may be spatially separated from one another, and each transceiver may operate according to its own asynchronous clock signal. The processing unit 625 of a wireless transceiver 630 can be configured to process signals received by its antenna 620, and can also be configured to communicate with the processing units 625 of other wireless transceivers 630. The distances from the wireless transceivers 630 to the center of the target object 610 are shown as $d_1$ and $d_2$, respectively. Referring now to FIG. 7, depicted is an example TDOA ranging process that can be performed using the target object 610 of FIG. 6, according to an illustrative implementation. In FIG. 7, the TDOA ranging process can take place between a pair of anchors 705a and 705b (generally referred to as anchors 705) and the target object 610. Because the wireless transceivers 630 are spatially separated, the REQ packet from the anchor 705a can be received by both transceivers 630 at different times. Similarly, the RSP packet from the anchor 705b can also be received by both transceivers 630 at different times, assuming there is no signal path blocked by obstacle(s). The following notations are used in this disclosure:

The time that the REQ packet is received by wireless transceiver 630a as $t_{A1}$;

The time that the REQ packet is received by wireless transceiver 630b as $t_{A2}$;

The time that the RSP packet is received by wireless transceiver 630a as $t_{B1}$;

The time that the RSP packet is received by wireless transceiver 630b as $t_{B2}$.

As these time times are not recorded by any synchronized clock, the target object 610 may only calculate time difference values from the same transceiver 630, i.e., $t_{B1}-t_{A1}$, $t_{B2}-t_{A2}$. These time difference values can be used to estimate the location of the center of the target object 610 (x, y) as well as an angle θ of the line between the transceivers 630. In some implementations, these calculations can be performed, for example, by the processing units 625. The location of the anchor 705a can be represented as $(x_A, y_A)$, the location of the anchor 705b can be represented as $(x_B, y_B)$, the distance between the anchors 705a and 705b can be represented as $d_{AB}$ and the turn-around time between transmitting the RSP packet and receiving the REQ packet at the anchor 705b can be represented as $T_r$. The equations (1)-(2) above relating for time difference values can be used in calculating the location of the center of the target object 610 (x, y) and the angle θ. When a sufficient number of time difference values from different anchor pairs similar to the anchor pair 705a and 705b are collected by the target object 610, the location (x, y) and angle θ can be estimated via techniques such as NLS.

Figure 8A:
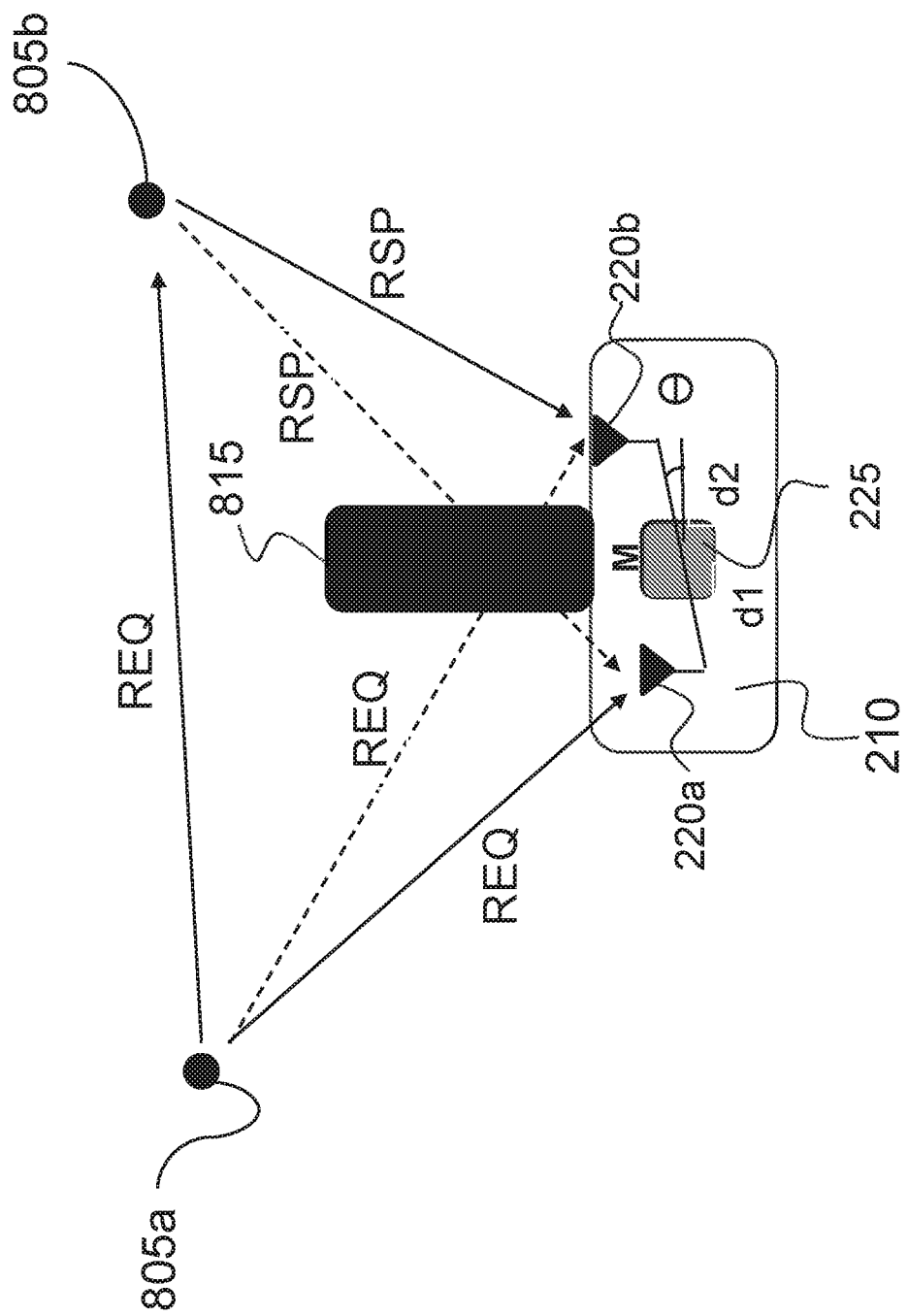
FIG. 8A illustrates an example TDOA ranging process that can be performed when signal paths are blocked by an obstacle, according to an illustrative implementation.
Figure 8B:
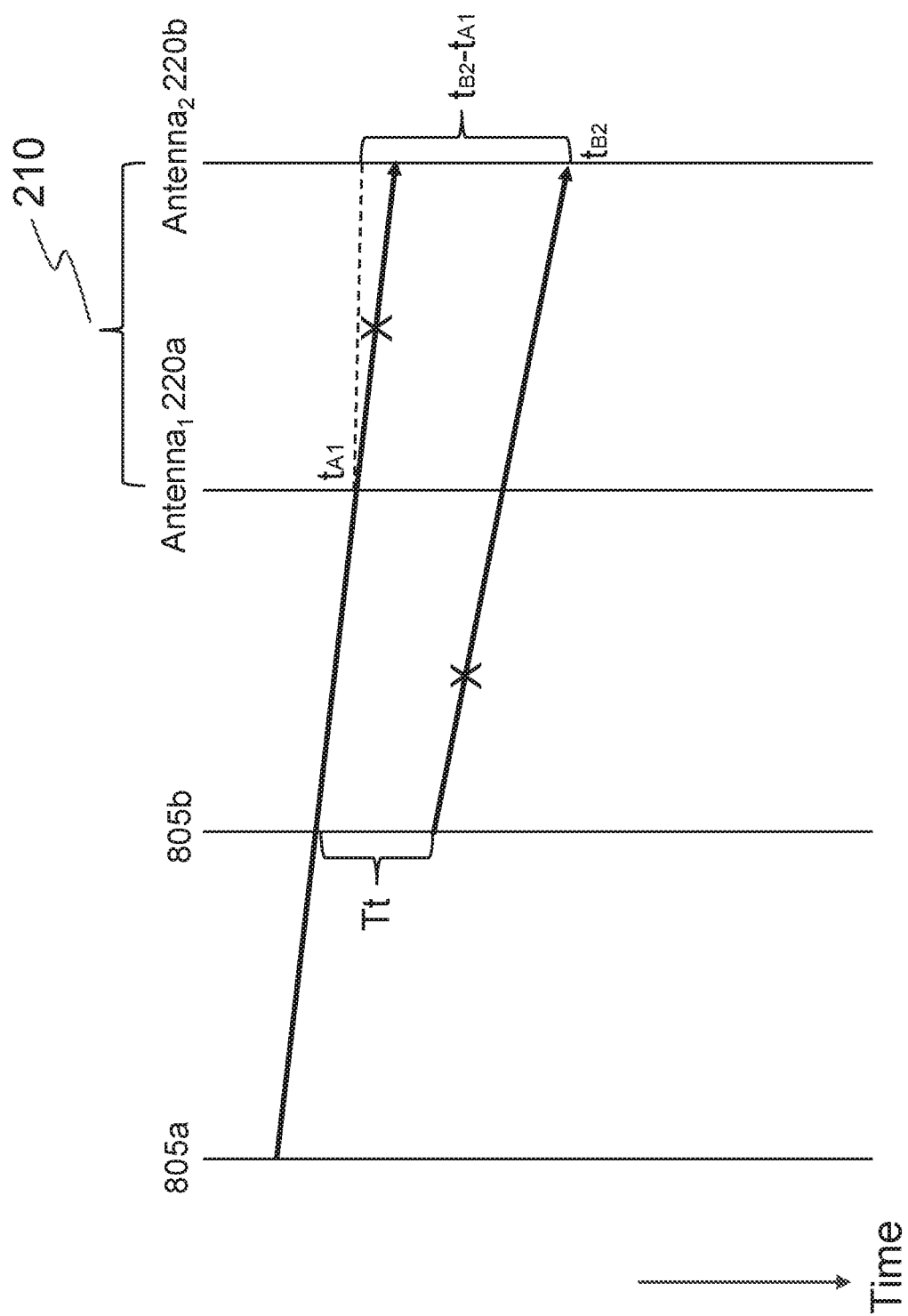
FIG. 8B illustrates an example TDOA transmission schedule that can be implemented in the TDOA scenario illustrated in FIG. 8A, according to an illustrative implementation.

In some instances, there may be an obstacle that obstructs a path between an anchor 705 and the target object 610. As a result, some of the LOS signal paths may be blocked. FIG. 8A illustrates an example TDOA ranging process that can be performed when signal paths are blocked by an obstacle, according to an illustrative implementation. In some implementations, the scenario shown in FIG. 8A can include the target object 210 shown in FIG. 2. FIG. 8A also shows an obstacle 815 blocks the LOS paths between an anchor 805a and the antenna 220b on the target object 210, as well as the path between an anchor 805b and the antenna 220a on the target object 201. FIG. 8B illustrates an example TDOA transmission schedule that can be implemented in the TDOA scenario illustrated in FIG. 8A, according to an illustrative implementation. Because of the presence of the obstacle 815, the target object 210 may not receive the REQ packet from the anchor 805a on the antenna 220b, as well as the RSP packet from the anchor 805b on the antenna 220a. Therefore, there may be only one value of the time difference, e.g., $t_{B2}-t_{A1}$, available on the target object 210. In this case, the spatially distributed antennas 220 on the target object 210 can help the target object 210 to obtain a valid time difference value from the transmissions of the anchors 805a and 805b (or other anchor pairs). When a sufficient number of time difference values from different anchor pairs similar to the anchor pair 805a and 805b are collected by the target object 210, the location of the target object 210 (x, y) and the angle θ can be estimated via techniques such as NLS.

Figure 9:
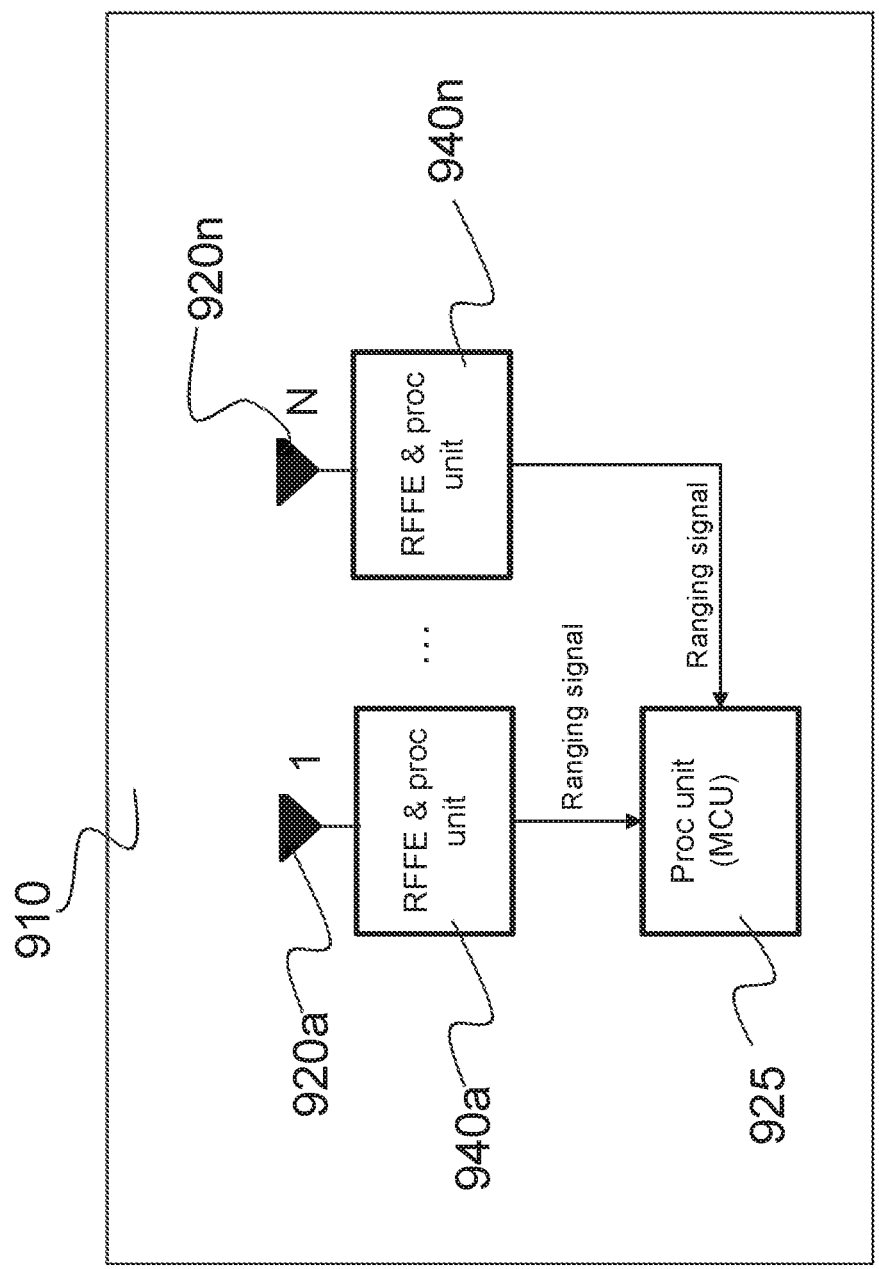
FIG. 9 illustrates a block diagram of a target object having multiple antennas and a central processing unit to process signals from all antennas, according to an illustrative implementation.

FIG. 9 illustrates a block diagram of a target object 910 having multiple antennas 920a-902n (generally referred to as antennas 920) and a central processing unit 925 to process signals from all antennas 920, according to an illustrative implementation. Each antenna also is coupled with a respective RF front-end (RFFE) processing unit 940a-940n (generally referred to as RFFE processing units 940). An RF signal is received by each antenna 920 and the signal can be processed by the respective RFFE processing unit 940. The signal from different antennas 920 can be further processed by the central processing unit 925 to get information about anchors and time and to calculate time differences from packets received from different anchor pairs.

Figure 10:
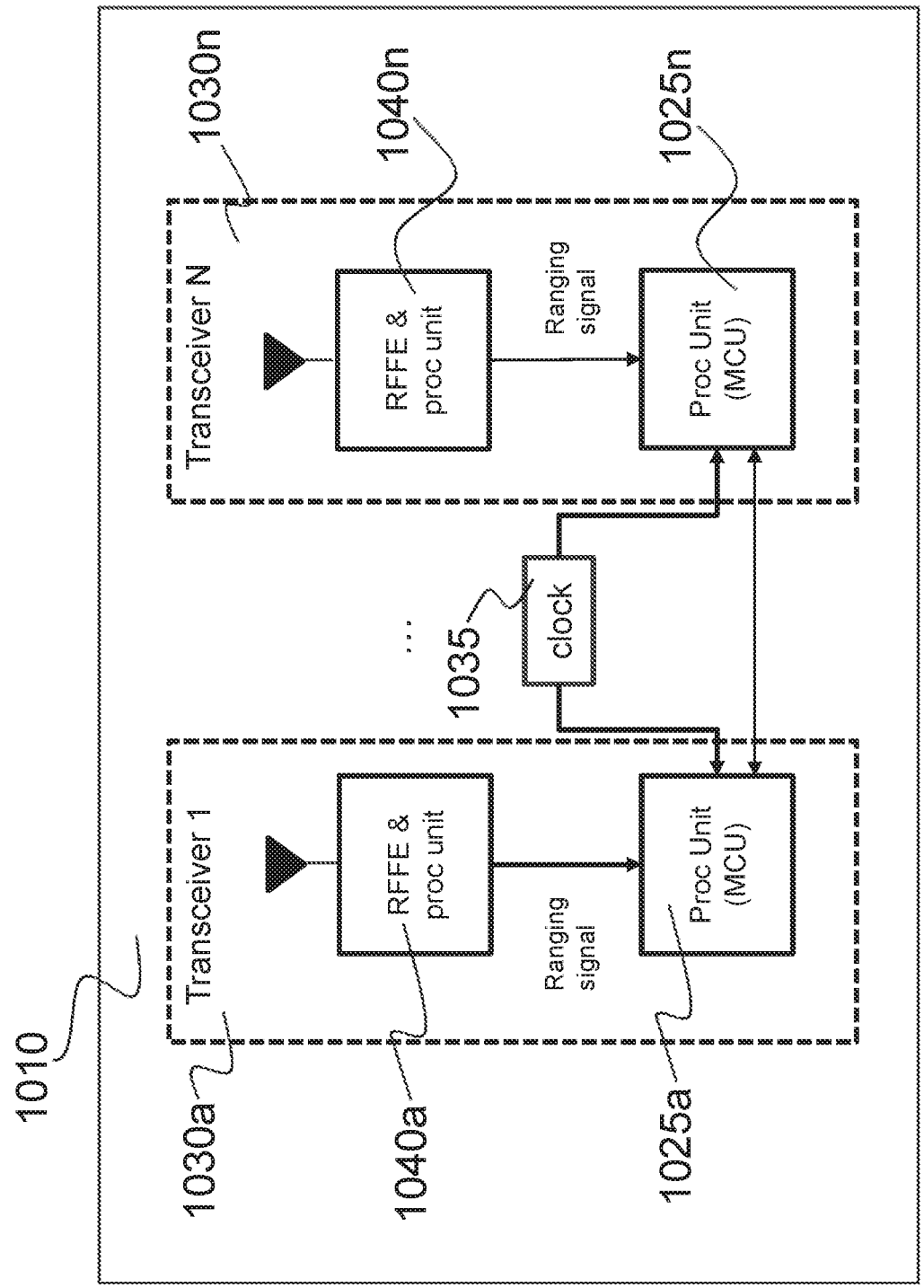
FIG. 10 illustrates a block diagram of a target object having multiple wireless transceivers which are spatially separated from one another, according to an illustrative implementation.

FIG. 10 illustrates a block diagram of a target object 1010 having multiple wireless transceivers 1030a-1030n (generally referred to as wireless transceivers 1030) which are spatially separated from one another, according to an illustrative implementation. Each transceiver 1030 includes a respective one of the RFFE processing units 1040a-1040n (generally referred to as RFFE processing units 1040) and a respective one of the processing units 1025a-1025n (generally referred to as processing units 1025). All of the transceivers 1030 are coupled with a common clock 1035, which can provide a common timing signal to the processing unit 1025 of each transceiver 1030. Thus, the internal clocks of all of the transceivers 1030 can be synchronized with one another. An RF signal can be received and processed by individual wireless transceivers 1030 to get information about anchors and times at which packets arrive. The transceivers 1030 can communicate with one another to calculate the time-difference from different received packets.

Figure 11:
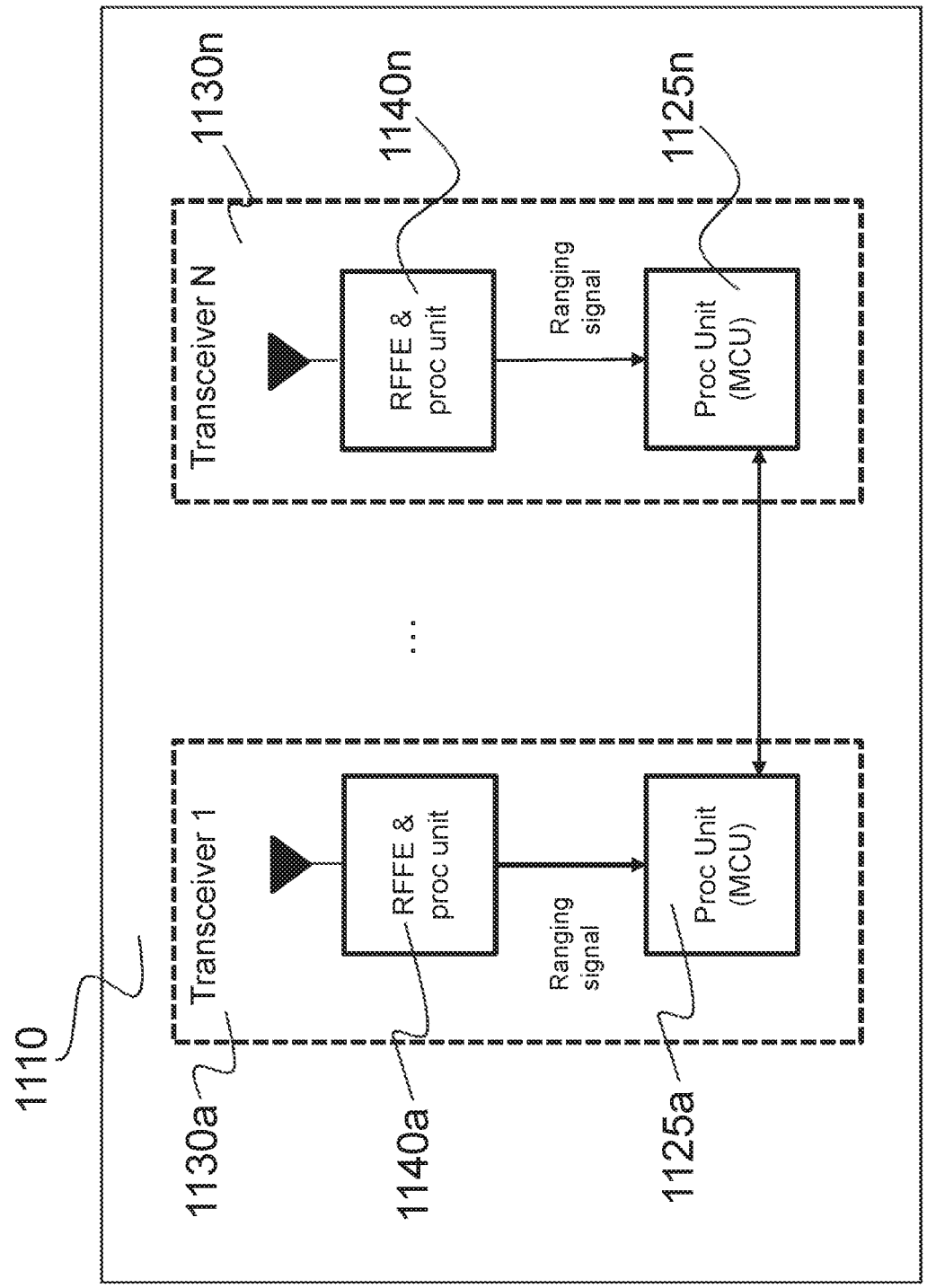
FIG. 11 illustrates a block diagram of a target object having multiple wireless transceivers which are spatially separated from one another, according to an illustrative implementation.

FIG. 11 illustrates a block diagram of a target object 1110 having multiple wireless transceivers 1130a-1130n (generally referred to as wireless transceivers 1130) which are spatially separated from one another, according to an illustrative implementation. Each transceiver 1130 includes a respective one of the RFFE processing units 1140a-1140n (generally referred to as RFFE processing units 1140) and a respective one of the processing units 1125a-1125n (generally referred to as processing units 1125). Unlike the target object 1010 shown in FIG. 10, the target object 1110 does not include any synchronized clock source. An RF signal can be received and processed by individual wireless transceivers 1130 to get information about anchors and times at which packets arrive. The transceivers 1130 can communicate with one another to calculate the time-difference from different received packets.

Figure 12:
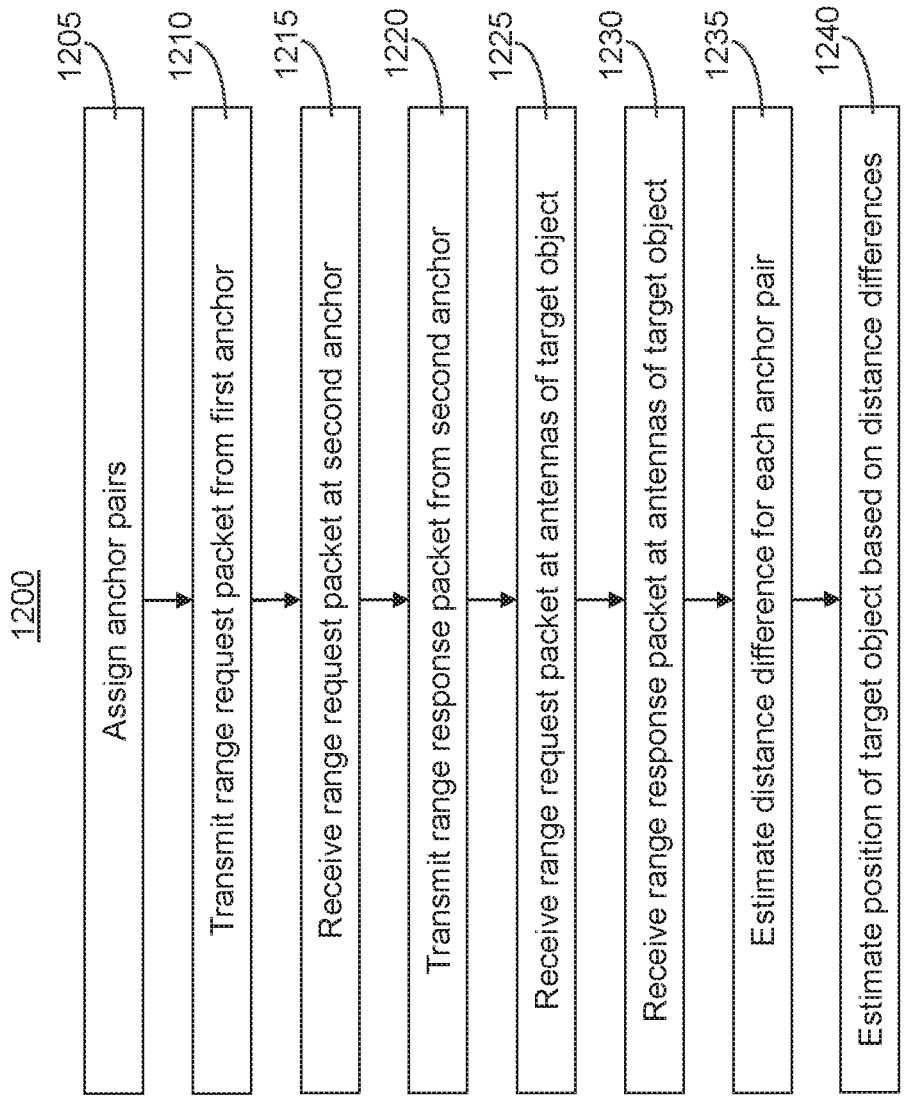
FIG. 12 illustrates a flowchart of an example method for locating a position of a target object, according to an illustrative implementation.

FIG. 12 illustrates a flowchart of an example method 1200 for locating a position of a target object, according to an illustrative implementation. The target object can be equipped with a plurality of spatially distributed antennas, and can be located within a network of a plurality of anchors at fixed locations. The method 1200 can include assigning anchor pairs (block 1205). In some implementations, each anchor pair of the plurality of anchor pairs can include at least two anchors of a plurality of anchors. Anchor pairs can be selected such that the anchors in each pair are within communication range of one another. In some implementations, anchor pairs may be overlapping, such that a single anchor may be included in more than one anchor pair. In some other implementations, the anchor pairs may be non-overlapping. Each anchor pair can be configured to transmit ranging packets according to a transmission schedule.

The method 1200 can include transmitting a range request (REQ) packet from a first anchor (block 1210). The first anchor can include a transmitter or a transceiver configured to transmit the REQ packet. In some implementations, the REQ packet can include header information indicating that the first anchor is the source of the REQ packet. In some implementations, transmitting the REQ packet can include broadcasting the REQ packet to any device within communication range without any destination specified. In some other implementations, the REQ packet can have at least one specified destination. For example, at least one destination can be specified in a header of the REQ packet.

The method 1200 can include receiving the range request packet at a second anchor (block 1215). The second anchor can include a receiver or transceiver configured to receive the REQ packet from the first anchor. In some implementations, the second anchor can be identical to the first anchor. The second anchor can record a time at which the REQ packet was received. The method 1200 can also include transmitting a range response (RSP) packet from the second anchor (block 1220). The second anchor can transmit the RSP packet in response to receiving the REQ packet from the first anchor. In some implementations, the RSP packet can include header information indicating that the second anchor is the source of the RSP packet. In some implementations, transmitting the RSP packet can include broadcasting the RSP packet to any device within communication range without any destination specified. In some other implementations, the RSP packet can have one or more specified destinations. For example, at least one destination can be specified in a header of the REQ packet. In some implementations, the destination can be specified as the first anchor. In some implementations, a turnaround time can be embedded in the RSP packet. In some implementations, a turnaround time can be predetermined and may not transmitted as part of the RSP packet In some implementations, the method 1200 can include repeating the operations of blocks 1210, 1215, and 1220 by additional pairs of anchors in the system. For example, the system may include any number of anchors grouped into pairs, and each pair of anchors can perform operations similar to those described above in connection with blocks 1210, 1215, and 1220 of the method 1200.

The method can include receiving, by at least one of the plurality of antennas on the target object, the REQ packet (block 1225). In some implementations, the REQ packet may be received by more than one of the plurality of antennas on the target object. The target object can include an antenna configured to receive the REQ packet from the first anchor. In some implementations, the antenna can be positioned on a fixed location of the target object, and can be spaced away from at least one other antenna that is positioned at a different fixed location on the target object. The target object can record a time at which the REQ packet was received.

The method can include receiving, by at least one of the plurality of antennas on the target object, the RSP packet (block 1230). In some implementations, the RSP packet can be received by more than one of the antennas on the target object. The RSP packet can be received in the same manner as the REQ packet, for example. In some implementations, the target object can also record a time at which the REQ packet was received.

The method can include estimating, for each anchor pair, a distance difference (block 1235). In some implementations, the estimation can be performed on the target object. For example, one or more processing units on the target object can be configured to perform the estimation. In some implementations, each of the processing units on the target can include a respective internal clock. In some implementations, the internal clocks of the antennas can be synchronized. In some implementations, the internal clocks of the antennas may not be synchronized. In some implementations, a different processing unit on the target object can be configured to perform the respective estimation for different anchor pairs. The distance difference can be the difference between a first distance from the target object to the first anchor and a second distance from the target object to the second anchor. In some implementations, the difference can be calculated based on times at which the REQ packet and the RSP packet are received at the target object.

The method can include estimating the position of the target object based on the estimated distance differences for each anchor pair (block 1240). In some implementations, the method can include transmitting the distance difference for each anchor pair from the target object to an external position estimator remote from the target object. Thus, the external position estimator can perform the estimate of the position of the target object based on the estimated distance differences for each anchor pair. In some implementations, the target object can include a local position estimator configured to estimate the position of the target object based on the estimated distance differences for each anchor pair. In some implementations, the position of the target object can be estimated using a technique such as nonlinear least-squares. In some implementations, the method can include transmitting the estimated position of the target object to at least one of the plurality of anchors in the network.

The systems and methods of this disclosure can enable more time difference value calculations available for location estimation from TDOA ranging processes when there is no obstacle in LOS signal paths. Therefore it could statistically improve the location estimation accuracy with additional time difference values, as compared with existing methods and systems. In addition, the systems and methods of this disclosure can enable a higher probability to get valid time difference values for location estimation from TDOA ranging process when one or more obstacles are present. Therefore, it is more robust for TDOA based location estimation than the existing methods/systems in the literature.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for locating a position of a target object equipped with a plurality of antennas spatially distributed on the target object, wherein the target object participates in a network of a plurality of anchors at fixed locations, the method comprising:
assigning a plurality of anchor pairs, each anchor pair of the plurality of anchor pairs including at least two anchors, wherein each anchor pair is configured to transmit ranging packets according to a transmission schedule by:
transmitting, by a first anchor of the anchor pair, a first omnidirectional radio frequency (RF) signal comprising a range request (REQ) packet;
receiving, by a second anchor of the anchor pair, the REQ packet;
transmitting, by the second anchor in response to the REQ packet, a second omnidirectional RF signal comprising a range response (RSP) packet;
receiving, by at least two of the plurality of antennas on the target object, the first omnidirectional RF signal comprising the REQ packet;
receiving, by the at least two of the plurality of antennas on the target object, the second omnidirectional RF signal comprising the RSP packet;
calculating time differences at which the first omnidirectional RF signal and the second omnidirectional RF signal are received by the at least two of the plurality of antennas of the target object; and
estimating the position of a center between the at least two of the plurality of antennas of the target object from the time differences.

2. The method of claim 1, wherein each of the plurality of antennas on the target object includes a respective internal clock.

3. The method of claim 2, wherein the respective internal clocks of the plurality of antennas are synchronized.

4. The method of claim 2, wherein the respective internal clocks of the plurality of antennas are not synchronized.

5. The method for claim 1, wherein a turnaround time is embedded in the RSP packet.

6. The method for claim 1, where a turnaround time is predetermined and not transmitted as part of the RSP packet.

7. The method of claim 1, further comprising:
transmitting the time differences for each anchor pair from the target object to an external position estimator remote from the target object.

8. The method of claim 7, wherein the external position estimator estimates the position of the target object based on the time differences for each anchor pair.

9. The method of claim 1, wherein the target object includes a local position estimator configured to estimate the position of the center.

10. The method of claim 9, further comprising transmitting the position of the center to at least one of the plurality of anchors in the network.

11. A system for locating a position of a target object, the system comprising:
the target object equipped with a plurality of antennas spatially distributed and one or more processors;
a position estimator; and
a plurality of anchors at fixed locations forming an anchor network, each anchor of the plurality of anchors having a transceiver, wherein the anchors are grouped into respective anchor pairs configured to transmit ranging packets according to a transmission schedule by:
transmitting, by a first anchor of a first anchor pair, a range request (REQ) packet;
receiving, by a second anchor of the first anchor pair, the REQ packet; and
transmitting, by the second anchor in response to the REQ packet, a range response (RSP) packet,
wherein each of the plurality of antennas on the target object is configured to receive the REQ packet and the RSP packet,
wherein the one or more processors is configured to calculate time differences at which the REQ packet and the RSP packet are received by at least two of the plurality of antennas of the target object, and
wherein the position estimator is configured to estimate the position of a center between the at least two of the plurality of antennas of the target object based on the time differences.

12. The system of claim 11, wherein:
each of the plurality of antennas is coupled with a respective RF front-end (RFFE) processing unit; and
the one or more processors comprise a central processing unit coupled with all of the RFFE processing units.

13. The system of claim 11, wherein:
each of the plurality of antennas is coupled with a respective RF front-end (RFFE) processing unit; and
the one or more processors comprise a respective processing unit coupled with a respective one of the RFFE processing units.

14. The system of claim 13, wherein the one or more processors are not synchronized.

15. The system of claim 11, wherein a turnaround time is embedded in the RSP packets.

16. The system of claim 11, wherein a turnaround time is predetermined and not transmitted as part of the RSP packet.

17. The system of claim 11, wherein the position estimator is local to the target object.

18. The system of claim 11, wherein the position estimator is remote from to the target object.

19. The system of claim 18, wherein the one or more processors are further configured to transmit the time differences for each anchor pair from the target object to the position estimator.

20. The system of claim 11, wherein the one or more processors are further configured to transmit the position of the target object to at least one of the plurality of anchors in the anchor network.

* * * * *